United States Patent
Sardet

(10) Patent No.: US 9,028,227 B2
(45) Date of Patent: May 12, 2015

(54) ELECTROMAGNETIC PUMP WITH OSCILLATING PISTON

(75) Inventor: François Sardet, Combs-la-Ville (FR)

(73) Assignee: Sauermann Industrie SA, Chevry Cossigny (FR)

( * ) Notice: Subject to any disclaimer, the term of this patent is extended or adjusted under 35 U.S.C. 154(b) by 115 days.

(21) Appl. No.: 13/113,639

(22) Filed: May 23, 2011

(65) Prior Publication Data

US 2011/0286868 A1    Nov. 24, 2011

(30) Foreign Application Priority Data

May 21, 2010 (FR) .................... 10 54000

(51) Int. Cl.
 F04B 35/04 (2006.01)
 F04B 17/04 (2006.01)
 H02K 33/16 (2006.01)
(52) U.S. Cl.
 CPC .............. *F04B 17/046* (2013.01); *H02K 33/16* (2013.01)
(58) Field of Classification Search
 CPC .... F04B 35/045; F04B 17/046; F04B 17/042; H02K 33/02; H02K 33/10
 USPC ................................................. 417/417, 416
 See application file for complete search history.

(56) References Cited

U.S. PATENT DOCUMENTS

| | | | | |
|---|---|---|---|---|
| 3,058,649 A * | 10/1962 | Plegat | ............................ | 417/418 |
| 3,836,289 A * | 9/1974 | Wolford et al. | ................ | 417/417 |
| 3,894,817 A * | 7/1975 | Majoros et al. | ................ | 417/415 |
| 4,150,922 A * | 4/1979 | Cuenoud et al. | ................ | 417/45 |
| 4,437,815 A * | 3/1984 | McMullen | ...................... | 417/418 |
| 4,541,787 A * | 9/1985 | DeLong | ......................... | 417/417 |
| 4,775,301 A * | 10/1988 | Cartwright et al. | ............ | 417/417 |
| 5,201,641 A * | 4/1993 | Richer | ........................... | 417/417 |
| 5,434,549 A * | 7/1995 | Hirabayashi et al. | .......... | 335/229 |
| 5,924,975 A * | 7/1999 | Goldowsky | ...................... | 600/16 |
| 6,326,706 B1 * | 12/2001 | Zhang | ......................... | 310/12.31 |
| 6,598,621 B1 * | 7/2003 | Wygnanski | .............. | 137/624.18 |
| 7,094,041 B2 * | 8/2006 | Hashimoto et al. | ............ | 417/417 |
| 7,288,085 B2 * | 10/2007 | Olsen | ........................... | 604/891.1 |
| 7,679,227 B2 * | 3/2010 | Brennvall et al. | ................ | 310/14 |

(Continued)

FOREIGN PATENT DOCUMENTS

| FR | 1358832 | 4/1964 |
|---|---|---|
| FR | 1554354 | 1/1969 |

(Continued)

OTHER PUBLICATIONS

French Search Report dated Oct. 27, 2010 from French Application No. 1054000, filed May 21, 2010.

*Primary Examiner* — Charles Freay
*Assistant Examiner* — Lilya Pekarskaya
(74) *Attorney, Agent, or Firm* — David D. Brush; Western, Champlin & Koehler, P.A.

(57) ABSTRACT

An electromagnetic pump is provided, which includes a hollow tubular body extending along a longitudinal direction, a piston mounted so as to be able to move inside the hollow tubular body, a solenoid, supplied with alternating current and assembled around at least a portion of the body and a magnetic envelope surrounding at least a portion of the body. The presence of a magnet magnetized longitudinally in a predetermined direction and a magnetic envelope orienting and channeling flux lines created by the magnet either around the solenoid or directly inside themselves creates an oscillating magnetic force on the piston.

13 Claims, 6 Drawing Sheets

(56) References Cited

U.S. PATENT DOCUMENTS

| | | | |
|---|---|---|---|
| 7,981,107 B2* | 7/2011 | Olsen | 604/891.1 |
| 2004/0028532 A1* | 2/2004 | Beyer et al. | 417/62 |
| 2005/0025638 A1* | 2/2005 | Buffet | 417/416 |
| 2006/0210410 A1* | 9/2006 | Mokler | 417/416 |

FOREIGN PATENT DOCUMENTS

| | | |
|---|---|---|
| FR | 1555291 | 1/1969 |
| FR | 1583650 | 11/1969 |
| GB | 2241287 | 8/1991 |

\* cited by examiner

ELECTROMAGNETIC PUMP WITH OSCILLATING PISTON

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to pumping devices for lifting condensates, in particular in air conditioning systems, refrigeration systems, ventilation systems or heating systems.

The disclosure more particularly relates to an electromagnetic fluid-pumping device for lifting condensates, comprising a magnetic piston oscillating under the effect of an electromagnetic field.

BACKGROUND OF THE DISCLOSURE

Throughout the text, a mechanical member will be said to be magnetic if the material that constitutes it has a relative magnetic permeability greater than 1. Such magnetic materials are for example ferromagnetic materials (iron, nickel, steel, cobalt, etc).

A permanent magnet is a mechanical member that is magnetised permanently and itself generates a magnetic field.

Electromagnetic pumps with an oscillating magnetic piston are used at the present time in numerous applications, including coffee machines, automatic dispensers, steam ironing units, irrigation systems, air conditioning systems, the automobile industry, etc.

In these various applications, the use is known of an electromagnetic pump comprising:
  a hollow tubular body extending along a longitudinal direction,
  a magnetic piston mounted so as to move longitudinally inside the hollow tubular body, the piston being itself hollow and traversing longitudinally,
  a coil supplied by a half-cycle rectified alternating current forming an electromagnet,
  a fluid-suction chamber delimited by a fluid inlet in the hollow tubular body and the movable magnetic piston,
  a fluid-exhaust chamber delimited by a fluid exhaust outlet in the hollow tubular body and the movable magnetic piston,
  a working spring provided in the suction chamber and extending between the fluid inlet and the movable magnetic piston,
  non-return valves mounted at the inlet and outlet of the discharge chamber.

Such a pump enables fluid to be pumped by alternating axial movements of the piston under the effect of the magnetic field created by the electromagnet. This is because, in accordance with the physical principle of maximum flux, the magnetic piston moves spontaneously under the effect of a magnetic field so that the magnetic flux passing through it is maximum.

Thus, at each current amplitude in the coil, the piston is moved counter to the working spring, housed in the suction chamber. This movement leads to an increase in the volume of the discharge chamber and reducing the pressure therein, which causes the non-return valve of the discharge chamber inlet to open. The fluid can then pass from the suction chamber to the discharge chamber through the hollow piston.

When the current in the coil of the electromagnet decreases and then becomes zero, the electromagnetic force disappears and the working spring can push the piston in order to move it in the opposite direction. This movement creates an increase in pressure in the discharge chamber, which leads to the closure of the inlet non-return valve and to the opening of the outlet non-return valve. The fluid can then leave the discharge chamber. In addition, the movement of the piston leads to an increase in the volume of the suction chamber and therefore to a reduction in the pressure, which leads to the suction of fluid into the suction chamber. The pump is then ready to undergo a new current cycle.

One of the drawbacks of these pumps of the prior art lies in low hydraulic performance—in particular throughput and suction.

Another drawback of these pumps is that they have a low starting power, which impairs their overall robustness. In particular, the pistons of these pumps do not have a good capacity to unstick in the event of blocking.

Another drawback of these pumps is that the piston must be fixed precisely with respect to the air gap, in order to have stable hydraulic performance, which requires the use of parts having very precise tolerances.

Another drawback of these pumps is that they cannot be directly connected to the mains.

SUMMARY

An aspect of the disclosure relates to electromagnetic pump comprising:
  a hollow tubular body extending along a longitudinal direction,
  a piston mounted so as to be able to move longitudinally inside the hollow tubular body,
  a solenoid assembled around at least a portion of the hollow tubular body,
  characterised in that the piston comprises at least one permanent magnet, and at least one magnetic ring forming a magnetic portion of the piston,
  and in that the pump comprises at least one magnetic envelope guiding the flux lines created by the magnet arranged around part of said hollow tubular body and delimiting an air gap.

A pump according to an exemplary embodiment of the disclosure enables fluid to be pumped from a fluid inlet situated on one side of the piston to a fluid outlet situated on the other side of the piston by causing movements of the piston along the hollow tubular body. These movements result firstly from the creation of a magnetic field by means of the solenoid supplied with current and secondly from the magnetic field induced by the permanent magnet of the piston.

In addition, a pump according to an exemplary embodiment of the disclosure enables the solenoid to be supplied with non-rectified alternating current, controlled or not. This is because the presence of a magnet magnetised longitudinally in a predetermined direction makes it possible to interact with the changes in direction of the magnetic flux created by the solenoid and resulting from the change in sign of the alternating current. A pump according to an exemplary embodiment of the disclosure can therefore be connected directly to the public electric mains.

In addition, a pump according to an exemplary embodiment of the disclosure comprises a magnetic envelope forming an air gap surrounding at least part of the hollow tubular body. Thus the magnetic envelope can orient and channel the magnetic flux created by the magnet, either around the solenoid or directly inside the envelope itself according to the position of the piston with respect to the air gap. The air gap defines the working zone of the piston in the hollow tubular body.

The magnetic force exerted on the piston at rest is greater than that typically exerted on the piston of a known pump with equivalent geometry, which makes it possible to benefit from a greater starting power than on the pumps of the prior art. In particular, the mutual inductance, because of the air gap formed by the magnetic envelope, may be either zero or very strong.

Finally, the magnetic ring with which the piston is provided makes it possible to obtain a fit with the hollow tubular body that is much more precise than that which would have been obtained with a magnet with no magnetic ring. This is because the magnet is usually obtained by sintering, and the precision of a sintering material cannot generally be less than five hundredths of a millimeter, whereas a magnetic ring produced from a solid metal material can easily be machined with a precision of around a thousandth of a millimeter. Improving the precision of the fit of the piston in the hollow tubular body improves the seal on the piston and therefore the hydraulic suction pressure and discharge performances. Moreover, this improves the robustness of the whole, since the friction between the hollow tubular body and the piston when the pump is operating is borne by the magnetic ring rather than by the magnet, which is more fragile than the ring. The general performance and the service life are thus increased thereby.

According to a particular embodiment, the permanent magnet is magnetised longitudinally. Such a choice seems a priori to be contrary to common sense, since it increases the distance traveled in the air by the magnetic field lines created by the magnet at the air gap, which is of such a nature as to impair the performance of such a pump compared with that which would be obtained by magnetising the permanent magnet radially, that is to say in a direction perpendicular to the axis of the piston. The inventor has however observed that the performance of the pump is related to the force of the magnetic field generated by the magnet, the force itself being related to the volume of the magnet. Thus a radially magnetised magnet should have a large diameter in order to produce a magnetic field comparable to that produced by a magnet with a small diameter but with a greater length and magnetised longitudinally.

Advantageously, the piston comprises at least two magnetic rings arranged on either side of the permanent magnet.

The arrangement of a magnetic ring at each end of the permanent magnet enables the field lines to be channeled upstream and downstream of the permanent magnet of the piston, which improves the resulting electromagnetic force.

Advantageously, the magnetic envelope comprises two magnetic sleeves mounted on the hollow tubular body. These sleeves orient and channel the magnetic flux created by the magnet, either around the solenoid or directly inside the sleeves depending on the position of the piston in the tubular body.

According to an advantageous variant, the piston comprises at least two permanent magnets magnetised longitudinally and in opposite directions, these two magnets being separated by a magnetic portion.

The magnetic portion will preferentially consist of a magnetic ring, able to channel the field lines created by the magnets in order to limit the passage thereof in the air, which improves the resulting electromagnetic force.

Preferably a piston according to the above description comprises two magnetic rings arranged at the longitudinal ends of the piston not only further improving the guidance of the field lines but also reducing the tolerances of the outside diameter of the piston, in accordance with the above description.

Advantageously, a pump according to an exemplary embodiment of the disclosure comprises at least one first elastic member, referred to as the working member, provided in a so-called suction chamber formed by a space separating the piston from an inlet orifice of the pump, and able to be placed in at least one compression configuration by the piston so that the suction chamber has therein a first volume, and at least one second configuration in which the pressure is reduced and maintains the piston in a position such that the suction chamber has therein a second volume, greater than said first volume.

Advantageously, in a variant or in combination, a pump according to an exemplary embodiment of the disclosure comprises at least one second elastic member, referred to as the shock member, provided in a discharge chamber formed by a space separating the piston from an outlet orifice of the pump, and able to be placed in at least one first compression configuration by the piston so that the discharge chamber has therein a first volume, and at least one second configuration in which the pressure is reduced and maintains the piston in a position such that the discharge chamber has therein a second volume, greater than said first volume.

The working and shock members participate in the improvement of the hydraulic performance of a pump according to these variants. In particular, and in the case where the solenoid is supplied by an alternating current, when the current is for example positive, the piston, subjected to the interaction between the magnetic fields, undergoes an electromagnetic force that moves it in a direction causing a reduction in the volume of the suction chamber. (The actual direction of movement of the piston depends on the sign of the current and the winding direction. It is here considered as a hypothesis that, when the current is positive, the electromagnetic force is oriented from the discharge chamber towards the suction chamber.) This movement of the piston therefore compresses the working member.

In addition, this movement leads to a reduction in the volume of the suction chamber and an increase in the volume of the discharge chamber. The increase in the volume of the discharge chamber involves a reduction in the pressure, which leads to the movement of the fluid from the suction chamber to the discharge chamber.

When the amplitude of the current becomes negative, the piston is then subjected to an electromagnetic force of the opposite direction to the electromagnetic force corresponding to a positive current. In addition, the working member participates in the movement of the piston while relaxing. This movement reduces the volume of the discharge chamber, by compressing the shock member, and therefore leads to increasing the pressure of the fluid in the discharge chamber. Thus the fluid is expelled out of the pump by the exit of fluid. In addition, this movement, by increasing the volume of the suction chamber, leads to reducing the pressure therein, which causes the suction of fluid into the suction chamber by the entry of fluid. The pump has thus performed a complete cycle and can begin a new pumping cycle.

During the suction and discharge phases, the piston is mainly subjected firstly to the mechanical forces resulting from the compression/relaxation of the working and impact members and secondly to an oscillating magnetic force resulting from the interaction of the magnetic fields created by the permanent magnet of the piston and by the solenoid supplied with current. This oscillating magnetic force depends on the mutual permeance between the magnetised piston and the solenoid, the magnetic potential of the solenoid and the magnetic potential of the permanent magnet of the piston. This magnetic force changes direction like the current that supplies the solenoid.

Thus, for example, during part of the fluid discharge phase, the pump according to an exemplary embodiment of the disclosure is subjected to two forces that are added together, to within a phase difference, in order to drive the fluid from the fluid inlet as far as the fluid outlet: the magnetic interaction force created by the solenoid and by the permanent magnet on one hand and the relaxation force of the working member on the other hand.

In pumps of the prior art, the piston not being provided with a permanent magnet, only a rectified current supply is possible, and the discharge of fluid results only from the relaxation force of the elastic working member. In particular, in the discharge phase, the current is zero and therefore the magnetic field of the solenoid is also zero.

A pump according to an exemplary embodiment therefore makes it possible to achieve better suction and output performances than the pumps of the prior art since the discharge and suction result from the addition of two forces: one produced by the elastic member and the other by an oscillating electromagnetic force.

The elastic working and shock members may be of all types. They are for example helical springs, rubber pads, rams, etc. Advantageously and according to an exemplary embodiment, the working and impact members are springs.

A pump according to an exemplary embodiment of the disclosure can have its fluid inlet and outlet at any point on the hollow tubular body. Nevertheless, according to an advantageous variant, the fluid inlet and outlet are provided respectively in each of the longitudinal ends of the hollow tubular body.

Thus the fluid inlet and outlet are in the axis of the movement of the piston, which limits the pressure drops and improves the circulation of fluid within the hollow tubular body.

Advantageously, a pump according to an exemplary embodiment of the disclosure comprises an upstream non-return device carried by the piston and provided at a downstream end of the piston defining the upstream end of the fluid discharge chamber, and a downstream non-return device provided at the fluid outlet.

These non-return devices are provided in the tubular body so that the fluid can pass from the suction chamber to the discharge chamber while minimising the phenomenon of reflux. When the piston is moved into a position in which the suction chamber has its volume decreased and the pressure of the fluid in the discharge chamber decreases, the upstream non-return device opens spontaneously in order to allow the fluid to pass from the suction chamber to the discharge chamber. When the piston is moved into a position in which the discharge chamber has its volume decreased and the pressure of the fluid in this chamber increases, the upstream non-return device spontaneously closes and the downstream non-return device spontaneously opens.

Advantageously a pump according to an exemplary embodiment of the disclosure comprises at least one magnetic casing for guiding the flux lines surrounding the solenoid.

An exemplary embodiment of the disclosure also concerns a pump characterised in combination by all or some of the features mentioned above or below.

BRIEF DESCRIPTION OF THE DRAWINGS

Other aims, features and advantages will emerge from a reading of the following description given solely non-limitatively and which refers to the accompanying figures, in which.

DETAILED DESCRIPTION OF ILLUSTRATIVE EMBODIMENTS

In the figures, the scales and proportions are not strictly complied with, for purposes of illustration and clarity.

Figure 1:
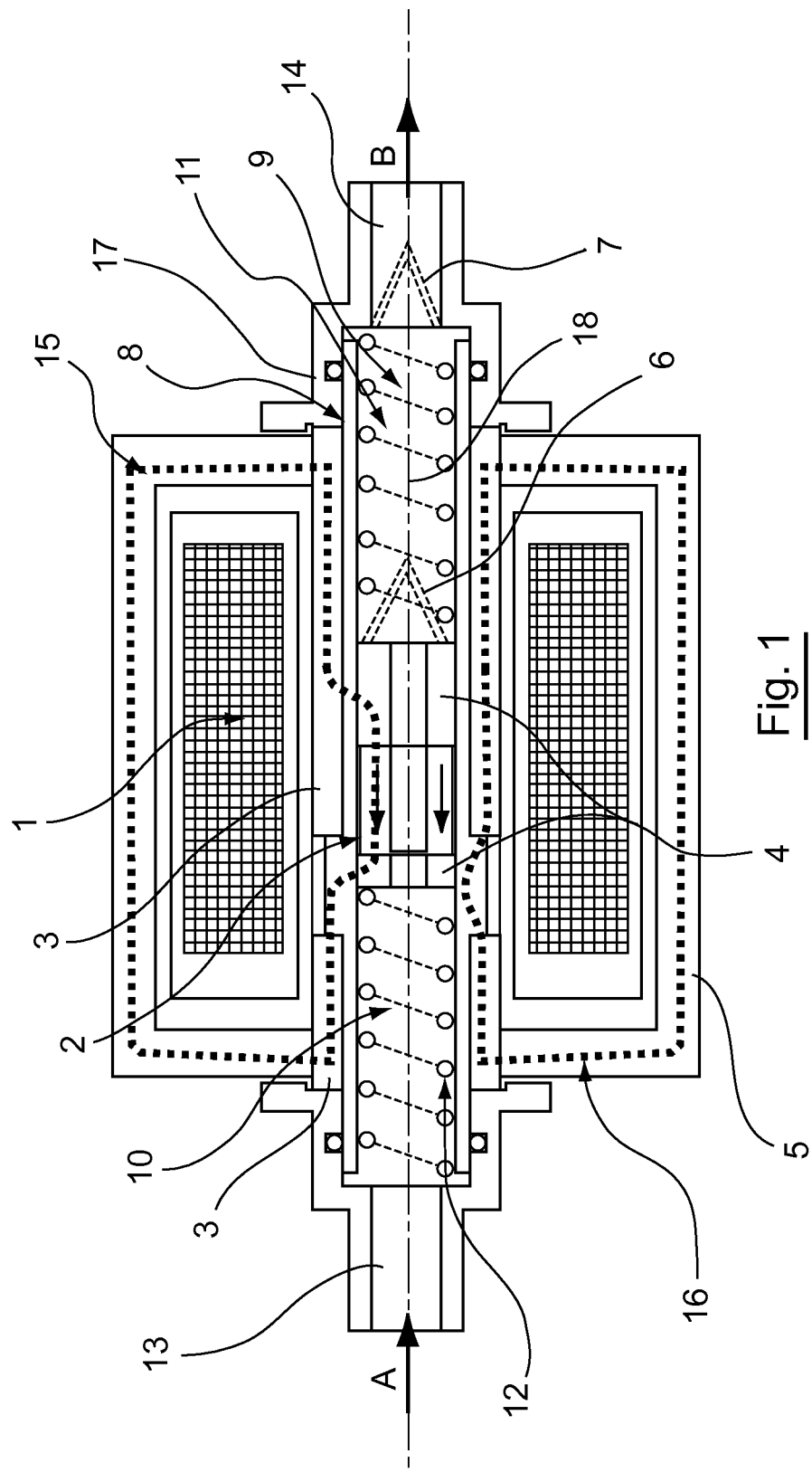
FIG. 1 is a schematic view in longitudinal section of a pump according to one embodiment of the disclosure.
Figure 3:
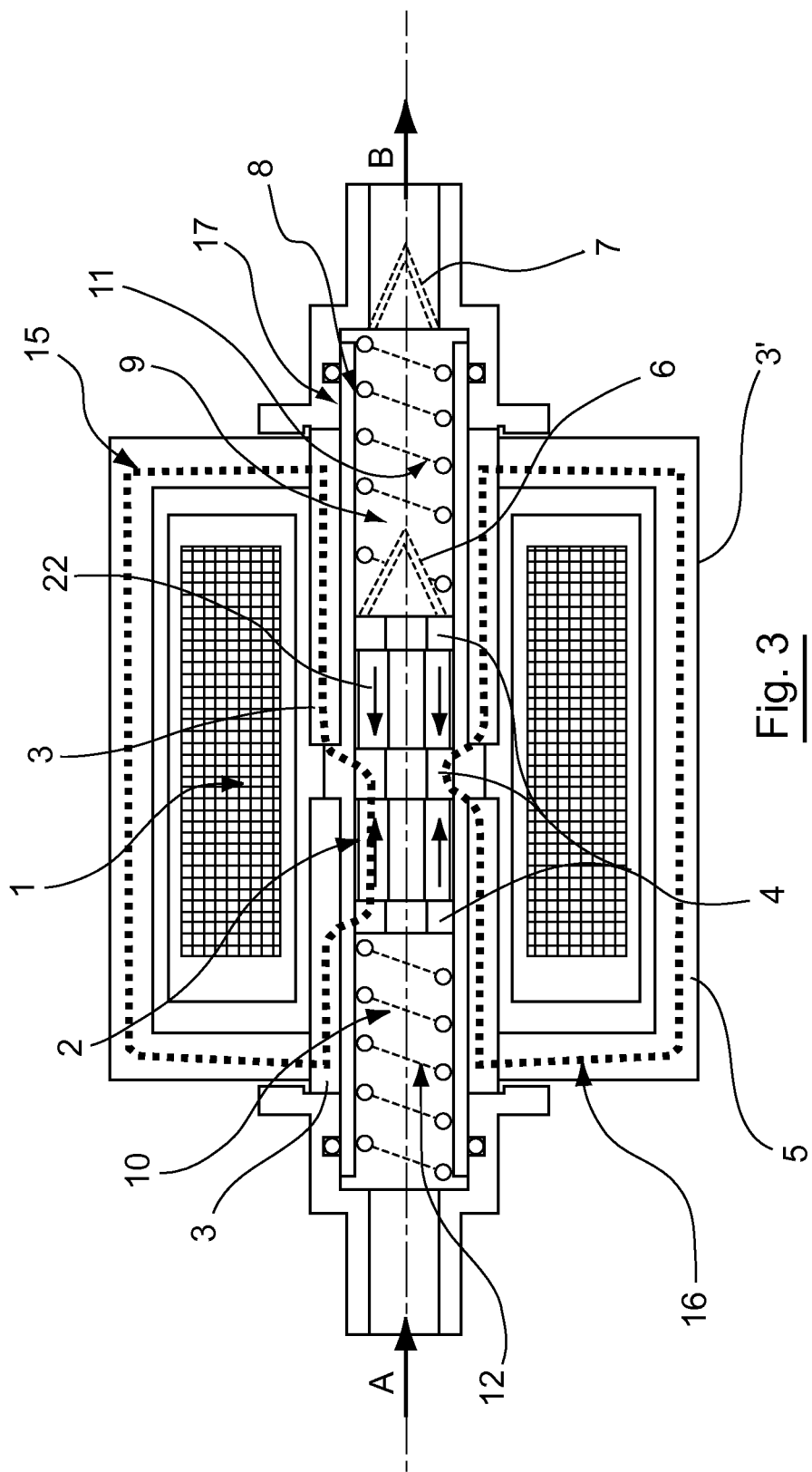
FIG. 3 is a schematic view in longitudinal section of a pump according to another embodiment of the disclosure.

Throughout the detailed description that follows with reference to figures, the terms "upstream" and "downstream" are used with reference to the direction of flow of the fluid in the pump, when the latter is in operation. In FIGS. 1 and 3, the fluid enters the pump through the end 13 in the direction of the arrow A and leaves the pump through the end 14 in the direction of the arrow B. Thus the end 13 is an upstream end and the end 14 is a downstream end.

A pump according to an illustrative aspect of the disclosure comprises a hollow tubular body 8 extending along a longitudinal direction 18. This hollow tubular body 8 may be of any type. Preferably this body 8 is cylindrical with a circular base, with an axis of symmetry coinciding with the longitudinal direction 18.

The body 8 has on either side: a fluid entry 13 in the hollow tubular body 8, a fluid outlet 14 in the hollow tubular body 8.

A piston comprising elements 4, 2 is mounted so as to be able to move longitudinally inside the body 8. This piston delimits with the inlet 13 a variable-volume fluid suction chamber 10 and, with the fluid outlet 14, a variable-volume discharge chamber 9. This piston has a hollow longitudinal bore for fluid to pass from the suction chamber 10 to the discharge chamber 9.

The pump also comprises a coil forming a solenoid 1 coiled around at least a portion of the body 8 and adapted to be supplied by an electric current generating a magnetic field. The solenoid may be of any type. In particular, the number of turns thereof, the diameter of each turn and in general terms all the features of the solenoid can be determined according to the magnetic field sought. This solenoid 1 is, according to the embodiment in the figures, itself surrounded by a magnetic casing 5 to channel and guide the field lines generated by the solenoid and the magnet. Likewise, according to the embodiment in the figures, the body 8 is also surrounded by magnetic sleeves 3 and 3' forming a magnetic envelope and intended to channel and guide these flux lines. These magnetic sleeves 3 and 3' delimit an air gap enabling the flux lines created by the magnet to pass either around the solenoid 1 or directly in one of the two sleeves 3 or 3'.

Figure 2:
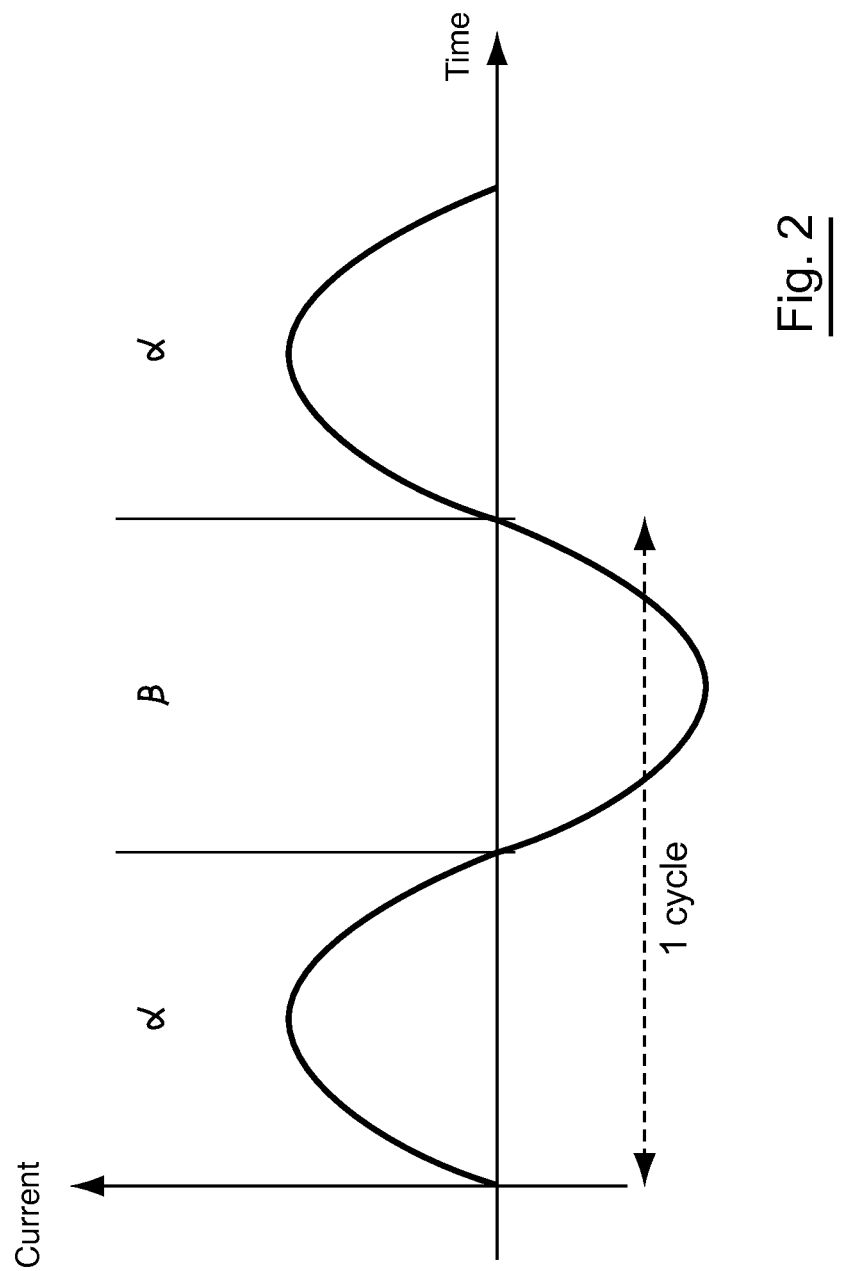
FIG. 2 is a schematic view of one and a half cycles of the variation in the current supplying a solenoid of a pump according to one embodiment of the disclosure.

According to the embodiment in the figures, the solenoid is supplied by a non-rectified full-cycle alternating current. FIG. 2 shows for example, over one and a half cycles, a variation in amplitude of the current supplying the solenoid of a pump according to one embodiment.

According to an example, the piston comprises at least one magnetic portion, which preferably is a magnetic ring 4, and at least one longitudinally magnetised permanent magnet 2 secured to the magnetic ring 4.

The magnetic ring 4 with which the piston is provided makes it possible to obtain a fit with the body 8 having much more precise tolerances than those that could be obtained with a magnet with no magnetic ring. This is because the magnets are usually obtained by sintering, and the precision of a sintered material cannot generally be less than five hundredths of a millimeter, whereas a magnetic ring produced from a solid metal material can easily be machined with a precision of around a thousandth of a millimeter. Improving the precision of the fit of the piston in the hollow tubular body improves the seal on the piston and therefore the hydraulic suction and discharge pressure performances. Moreover, this improves the robustness of the whole, since the friction between the hollow tubular body and the piston when the pump is operating are borne by the magnetic ring rather than by the magnet, which is more fragile than the ring. The general performance and the service life are thus increased thereby.

According to the embodiment in FIG. 1, the piston comprises two magnetic rings 4 arranged at each longitudinal end of the longitudinal magnetised permanent magnet 2. The permanent magnet 2 being magnetised longitudinally, it continuously generates a magnetic field, the flux line of which is shown schematically by the broken line 15.

The magnetic rings 4 are made from a magnetic material, that is to say for example ferromagnetic iron. These magnetic rings 4 are therefore adapted to channel the flux lines created by the magnet. Thus, when the solenoid is supplied by an alternating electric current, these rings 4 move under the effect of an oscillating magnetic force created by the interaction of the magnetic fields of the solenoid and magnet. A magnetic flux line generated by the solenoid is represented schematically by the broken line 16.

According to an illustrative embodiment, the pump comprises a working spring 12, provided in the suction chamber 10. This spring is for example a helical spring. This working spring 12 is adapted to occupy a first position in which it is compressed by the piston so that the suction chamber 10 had a first volume, and a second position in which it is relaxed and pushes the piston so that the suction chamber 10 has a second volume greater than said first volume.

According to one embodiment, the movement of the piston results from the sign of the current. In particular, and with reference to FIG. 2, the phase α corresponds to a phase in which the current is positive and the electromagnetic force negative so that the piston moves towards the fluid inlet, compressing the working spring 12. The phase β corresponds to a phase in which the current is negative and the electromagnetic force positive so that the piston moves towards the fluid outlet, with the help of the working spring 12.

In addition, according to one embodiment, the pump also comprises a shock spring 11, provided in the discharge chamber 9. This shock spring 11 is adapted to occupy a first position in which it is compressed by the piston so that the discharge chamber 9 has a first volume and a second position in which it is relaxed and pushes the piston so that the discharge chamber 9 has a second volume greater than said first volume.

According to the embodiment in the figures, the pump comprises an upstream non-return device 6 carried by the piston at a downstream end of the piston and a downstream non-return device 7 proved at the fluid outlet. These fluid non-return devices 6, 7 are for example non-return valves or non-return shutters or any similar equipment. The upstream non-return device 6 is for example carried directly by the piston at the longitudinal end of the piston that delimits the discharge chamber 9. The downstream non-return device 7 is for example carried by the tubular body 17 at the downstream longitudinal end of the discharge chamber 9. Each of these non-return devices enables fluid to pass from upstream to downstream according to the pressure levels in the suction and discharge chambers and minimises the return of fluid in the opposite direction.

According to the embodiment in the figures, the upstream non-return device 6 is carried by the piston at the longitudinal end of the piston that delimits the fluid discharge chamber 9 and the downstream non-return device 7 is carried by the body 17 at the fluid outlet 14.

Thus, when the piston is moved towards the fluid inlet, the pressure in the discharge chamber 11 decreases, which opens the upstream non-return device 6 so that the fluid can flow from the suction chamber 10 to the discharge chamber 9. When the piston is moved towards the fluid outlet, the pressure in the discharge chamber 9 increases, which opens the downstream non-return device 7 and closes the upstream non-return device 6 so that the fluid can flow from the discharge chamber 9 to the fluid outlet 14.

Figure 6A:
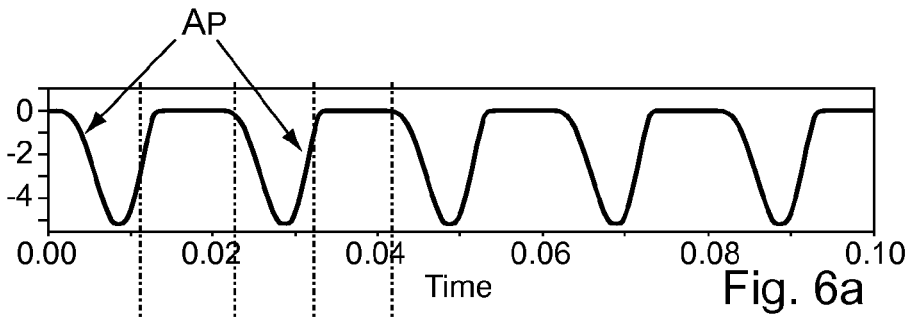
FIGS. 6*a*, 6*b* and 6*c* are schematic views of the change over time respectively in the magnetic force, the position of the piston and the force of the working spring of a pump of the prior art.
Figure 7A:
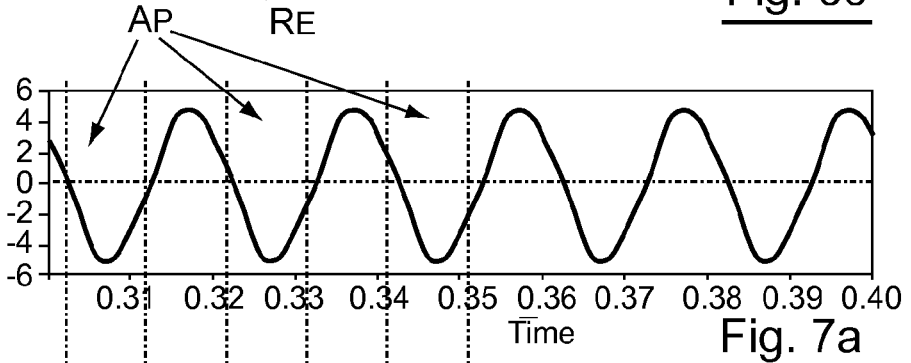
FIGS. 7*a*, 7*b* and 7*c* are schematic views of the change over time respectively in the magnetic force, the position of the piston and the force of the working spring of a pump according to one embodiment of the disclosure.

FIG. 7a shows the change over time in the magnetic force created by the solenoid and magnet in a pump according to the embodiment in the figures. The suction phases are shown schematically by the reference AP. FIG. 6a shows schematically, by way of comparison, the change over time in the magnetic force in a pump of the prior art not comprising a permanent magnet and not comprising a magnetic envelope defining an air gap.

Figure 6B:
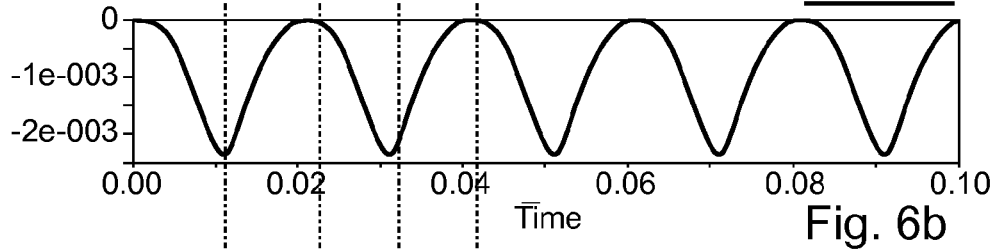
Figure 6C:
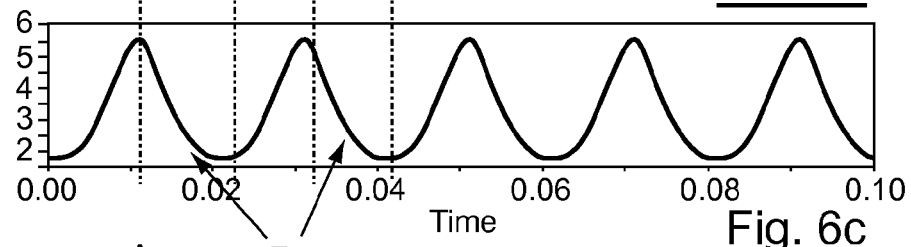
Figure 7B:
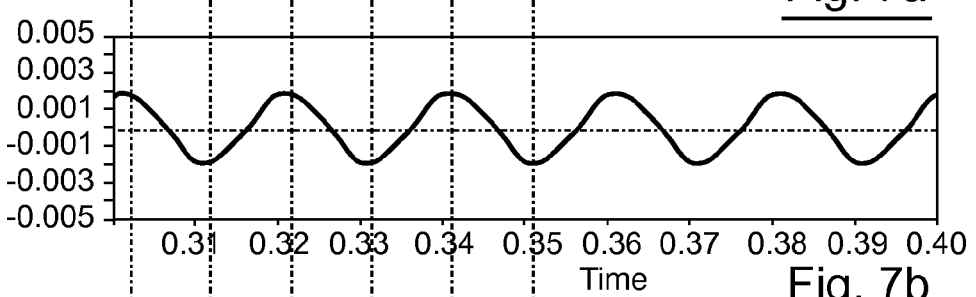
Figure 7C:
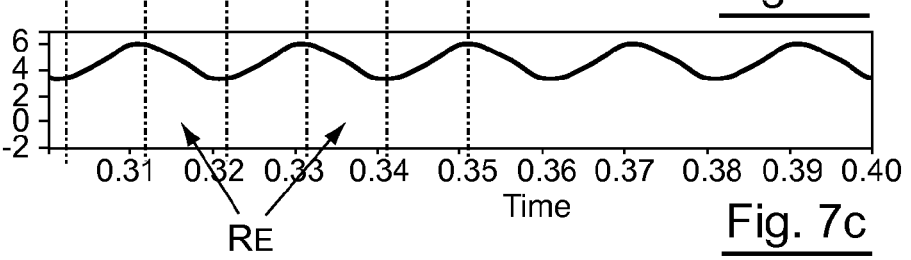

FIG. 7c shows the change over time in the force of the draw spring in a pump according to the embodiment in the figures. The discharge phases are represented schematically by the reference RE. The FIG. 6c shows schematically, by way of comparison, the change over time in the force of the draw spring in a pump of the prior art not comprising a permanent magnet and not comprising a magnetic envelope defining the air gap.

FIG. 7b shows the change over time in the position of the piston in the jacket of a pump according to the embodiment in the figures. FIG. 6b shows schematically, by way of comparison, the change over time in the position of a piston of a pump of the prior art not comprising a permanent magnet.

Figure 4:
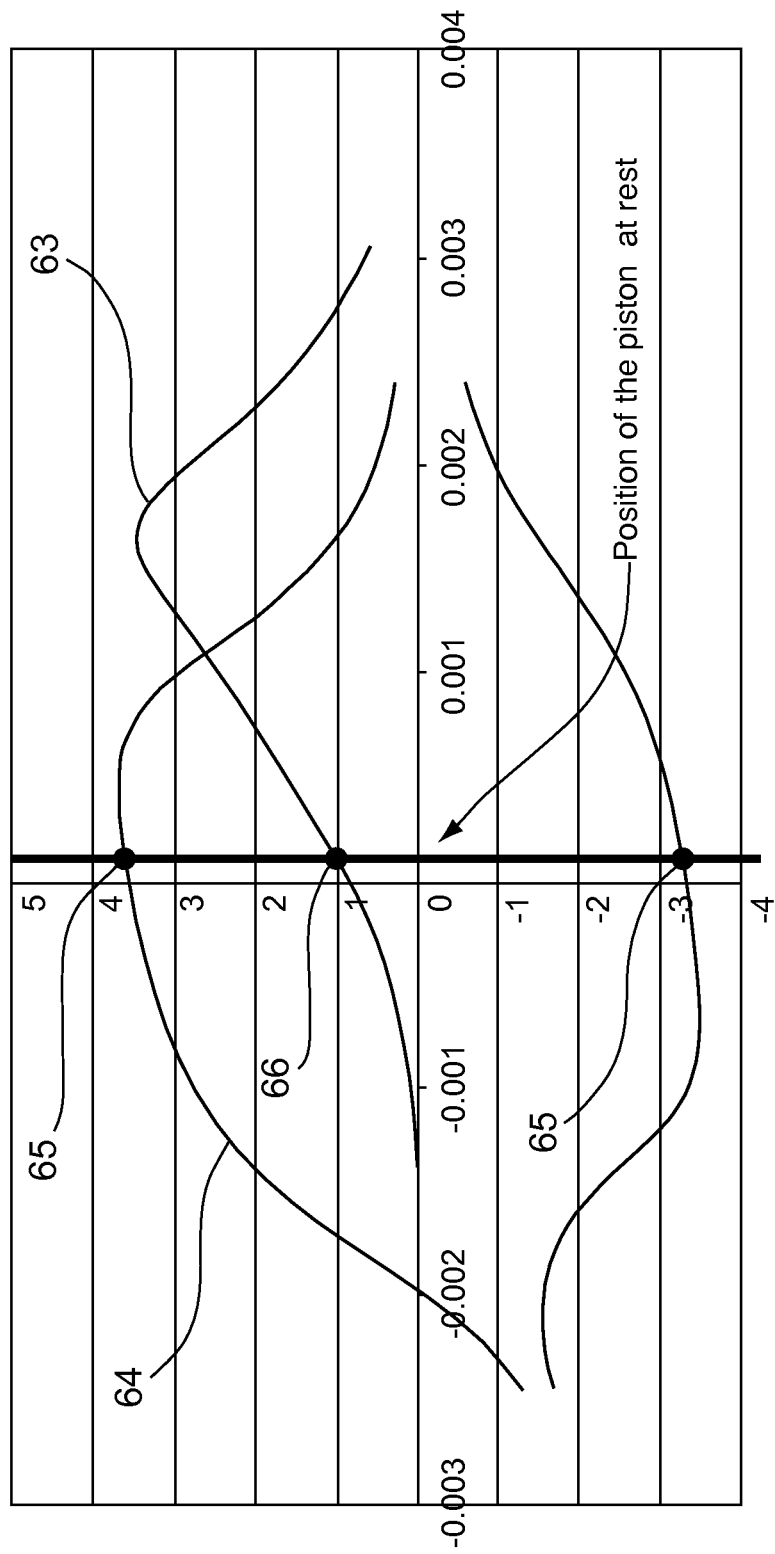
FIG. 4 is a schematic view of the force exerted on the magnetic piston according to its position in the jacket of a pump according to one embodiment of the disclosure.

FIG. 4 shows the changes in the force exerted on the piston (Y-axis) according to the position of the piston in the jacket (X-axis). The curve 64 corresponds to a pump according to the embodiment in the figures. The curve 63 corresponds to a pump according to a pump of the prior art.

The point 65 corresponds to the force exerted on the piston when the latter is in an idle position for a pump according to the embodiment in the figures. The point 66 corresponds, by way of comparison, to the force exerted on the piston, in the idle position, of a pump of the prior art.

These different curves reveal that, in a pump according to an exemplary embodiment of the disclosure, on starting up, the force exerted on the piston at rest is around four times greater, all other things being equal, than the force created by an oscillating-piston electromagnetic pump of the prior art.

In addition, in a pump according to an exemplary embodiment of the disclosure, the output and suction are around twice as great as those of an oscillating-piston electromagnetic pump of the prior art.

In addition, with a pump according to an exemplary embodiment of the disclosure, it is not necessary to precisely fix the piston with respect to the air gap in order to have stable hydraulic performances. Consequently it is not necessary to use parts having precise tolerances in the longitudinal direction.

Moreover, the fact that the piston comprises at least one magnetic ring makes it possible to obtain a precise fit between the piston and the hollow tubular body, which helps to improve the hydraulic performance of the pump and the robustness thereof during the functioning of the pump.

According to an advantageous variant as shown in FIG. 3, the piston comprises two longitudinally magnetised permanent magnets 2, 22 of opposite directions. These two magnets 2, 22 are separated by a magnetic ring 4 of the same material as the magnetic rings 4 forming the longitudinal ends of the piston. These magnets 2, 22 are magnetised so that the field lines passing through the piston are longitudinal and of opposite directions. A pump according to this embodiment thus makes it possible not only for the pump to function on an alternating current but also improves the hydraulic performance of the pump, the reciprocating travel of the piston benefiting from the contribution of the magnetic field of the magnets and the working and shock springs.

Figure 5:
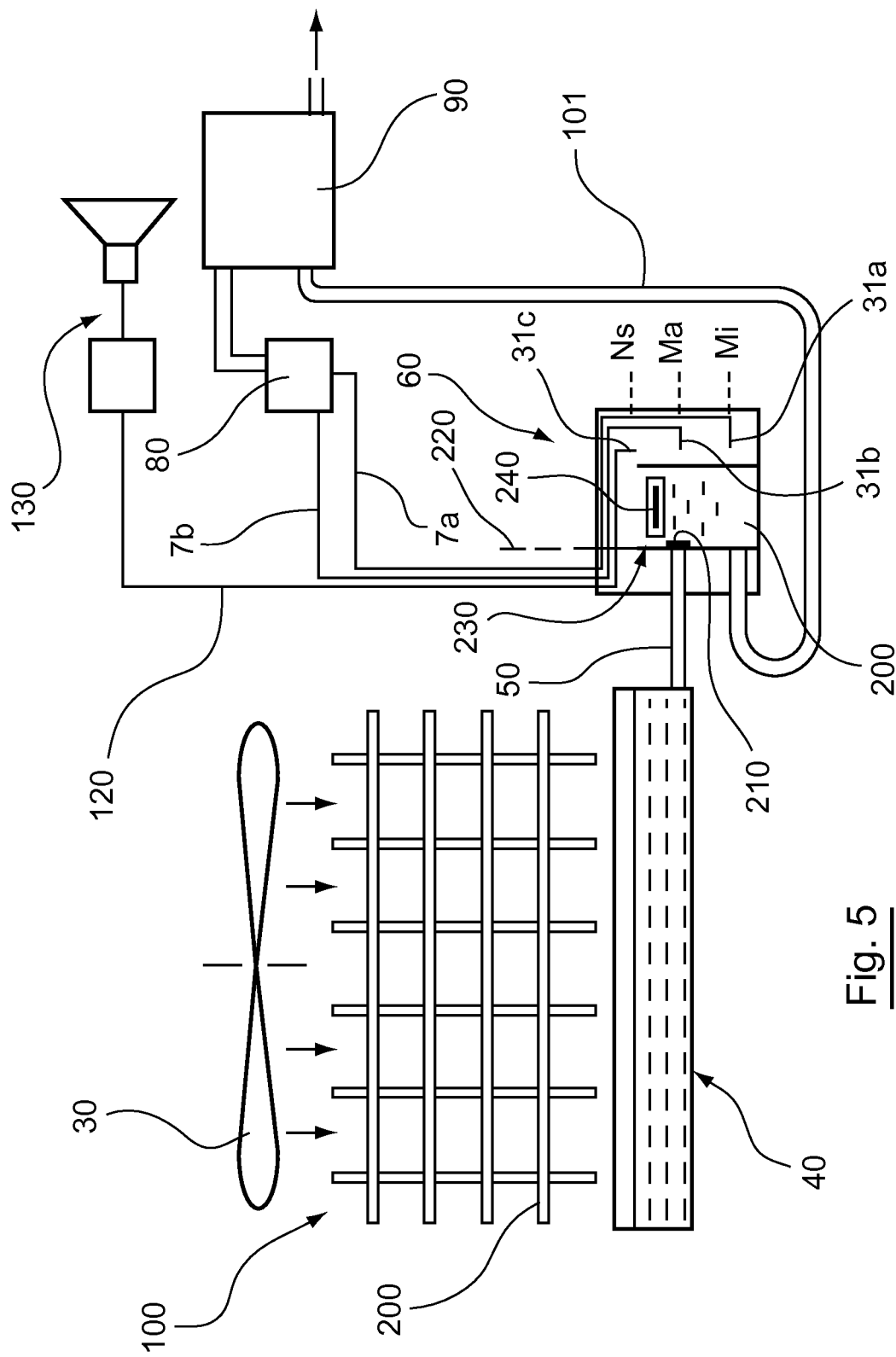
FIG. 5 is a schematic view of an air conditioning installation comprising a pump according to one embodiment of the disclosure for the discharge of condensates.

A pump according to an exemplary embodiment of the disclosure can be used for various applications. One advantageous use of the pump concerns the lifting of condensates in an air conditioning installation. In FIG. 5, such an installation 100 comprises an exchanger 200 inside which a refrigerating fluid circulates, a fan 30 intended to put the ambient air in movement in order to bring it into contact with the exchanger 200 so as to improve heat exchanges, and a tank for recovering the condensates 40 disposed under the exchanger. When the more or less moist ambient air is cooled in contact with the exchanger 200, the water vapour contained in the air condenses and droplets form on the external walls of the exchanger. These droplets then fall by gravity into the recovery tank 40.

To discharge the condensates recovered in the tank 40, the installation advantageously comprises a pump 90 controlled, that is to say in particular started and stopped, by means of a condensate level detection device 60.

This detection device 60 comprises a reservoir 200 that communicates firstly with the tank 40 by means of a discharge pipe 50 and secondly with the pump 90 by means of suction pipe 101. Inside the reservoir 200 there is a float 230 free to move vertically following the level of the condensates in the reservoir. This float 230 also contains a magnet 240.

Three flexible-blade switches 31a, 31b and 31c, each sealed in an ampoule and fixed outside a wall of the reservoir 200, are placed in the vicinity of the path of the magnet. These switches of the reed switch type are able to close under the effect of the magnetic field of the magnet 240. The switches 31a and 31b are connected by means of two electrical circuits 7a and 7b to the control 80 of the hydraulic pump 90. The switch 31c is connected by means of an electrical circuit 120 to the control of an alarm system 130.

A pump according to an exemplary embodiment of the disclosure thus improves the performance of the picking up of condensates of such an air conditioning installation.

This being the case, a pump according to an exemplary embodiment of the disclosure can also be used in other applications.

In addition, the pump is not limited solely to the embodiment described. A pump according to the disclosure can have a different geometry and architecture without nevertheless adversely affecting the improvements afforded by the pump described by way of example. Thus, in the embodiments described above, a movable part formed by the piston fulfils the function of a rotor carrying a field winding whereas the fixed part of the pump fulfils the function of a stator carrying an armature. It can however be entirely envisaged configuring a pump according to the disclosure so that its movable part forms the armature and its fixed part forms the field winding.

In at least one exemplary embodiment, a pump is provided, which has for equivalent geometry, hydraulic and acoustic performances that are improved with respect to pumps of the prior art.

In at least one exemplary embodiment, the pump has, for equivalent geometry, a starting power greater than that of pumps of the prior art.

In at least one exemplary embodiment, the pump has a hydraulic performance that is less susceptible to the tolerances of the parts making it up.

In at least one embodiment, an electromagnetic pump is provided that can be directly supplied by a non-rectified alternating current.

Although the present disclosure has been described with reference to one or more examples, workers skilled in the art will recognize that changes may be made in form and detail without departing from the scope of the disclosure and/or the appended claims.

What is claimed is:

1. An electromagnetic pump comprising:
   a hollow cylindrical body extending along a longitudinal direction and configured to receive a flow of liquid within the hollow cylindrical body,
   a first set of elements located within the hollow cylindrical body, comprising:
   at least one elastic working member;
   at least one elastic shock member; and
   a piston mounted within the hollow cylindrical body between the at least one elastic working member and the at least one elastic shock member, so as to be able to move longitudinally inside the hollow cylindrical body, wherein the piston comprises:
   at least one permanent magnet; and
   at least one magnetic ring, which simultaneously forms a magnetic portion of the piston and guides movement of the piston in the hollow tubular body; and
   a second set of elements located outside the hollow cylindrical body, comprising:
   a solenoid assembled around at least a portion of the hollow cylindrical body; and at least one magnetic envelope of magnetic material, which is arranged around part of said hollow cylindrical body, between an outer surface of the hollow cylindrical body and an inner surface of the solenoid, the magnetic envelope delimiting an air gap within the magnetic envelope, wherein the magnetic envelope of magnetic material is arranged to form a guide path for magnetic flux created by the permanent magnet and the solenoid.

2. The electromagnetic pump according to claim 1, wherein the permanent magnet is magnetised longitudinally.

3. The electromagnetic pump according to claim 2, wherein said piston comprises at least two magnetic rings arranged on either side of the permanent magnet.

4. The electromagnetic pump according to claim 2, wherein the piston comprises at least two permanent magnets magnetised longitudinally and in opposite directions.

5. The electromagnetic pump according to claim 4, wherein the two magnets are separated by the magnetic portion.

6. The electromagnetic pump according to claim 4, wherein said magnetic portion is formed by the magnetic ring.

7. The electromagnetic pump according to claim 4, wherein the piston comprises two magnetic rings arranged at the longitudinal ends of the piston.

8. The electromagnetic pump according to claim 1, wherein the at least one elastic working member is provided in a suction chamber formed by a space separating the piston from an inlet orifice of the pump, and able to be placed in at least one configuration of compression by the piston so that the suction chamber has therein a first volume, and in at least one second configuration in which the working member is relaxed and holds the piston in a position such that the suction chamber has therein a second volume greater than said first volume.

9. The electromagnetic pump according to claim 8, wherein the at least one elastic shock member is provided in a discharge chamber formed by a space separating the piston from an outlet orifice of the pump and able to be placed in at least one first configuration of compression by the piston so that the discharge chamber has therein a first volume, and in at least one second configuration in which the shock member is relaxed and holds the piston in a position such that the discharge chamber has therein a second volume, greater than said first volume.

10. The electromagnetic pump according to claim 9, wherein said working and shock members are springs.

11. The electromagnetic pump according to claim 9, wherein the fluid inlet and outlet are provided respectively at each of the longitudinal ends of said hollow cylindrical body.

12. The electromagnetic pump according to claim 9, wherein the pump comprises an upstream non-return device carried by said piston and a downstream non-return device provided at the fluid outlet.

13. The electromagnetic pump according to claim 1, wherein the pump comprises at least one magnetic casing containing the solenoid and arranged to guide flux lines surrounding the solenoid.

* * * * *